(12) United States Patent
Bodin et al.

(10) Patent No.: US 8,850,760 B2
(45) Date of Patent: Oct. 7, 2014

(54) METHOD AND DEVICE FOR PRODUCING A WINDOW GLAZING EQUIPPED WITH A PROFILED STRIP COMPRISING AN INSERT, AND WINDOW GLAZING OBTAINED

(75) Inventors: Cedric Bodin, Longueil-Annel (FR); Jean-Pierre Roze, Cauffrey (FR); Beatrice Mottelet, Compiegne (FR); Yoann Machizaud, Choisy au Bac (FR)

(73) Assignee: Saint-Gobain Glass France, Courbevoie (FR)

( * ) Notice: Subject to any disclaimer, the term of this patent is extended or adjusted under 35 U.S.C. 154(b) by 323 days.

(21) Appl. No.: 12/601,340

(22) PCT Filed: May 19, 2008

(86) PCT No.: PCT/FR2008/050862
§ 371 (c)(1),
(2), (4) Date: Jan. 7, 2010

(87) PCT Pub. No.: WO2008/145938
PCT Pub. Date: Dec. 4, 2008

(65) Prior Publication Data
US 2010/0166987 A1    Jul. 1, 2010

(30) Foreign Application Priority Data

May 21, 2007    (FR) ...................................... 0755166

(51) Int. Cl.
*E06B 3/00* (2006.01)
*B60J 1/00* (2006.01)
*B29C 45/14* (2006.01)

(52) U.S. Cl.
CPC ........... *B29C 45/14377* (2013.01); *B60J 1/006* (2013.01)
USPC ....................................... 52/208; 52/204.53

(58) Field of Classification Search
USPC ............ 296/84.1, 146.2, 146.3, 146.15, 201, 296/96.21, 93; 52/208, 204.53; 29/521.1, 29/527.2, 527.3, 465, 464; 425/450.1, 425/441, 442, 443
See application file for complete search history.

(56) References Cited

U.S. PATENT DOCUMENTS 4,202,522 A * 5/1980 Hanas et al. .................. 249/102
4,723,809 A * 2/1988 Kida et al. ................. 296/96.21
(Continued)

FOREIGN PATENT DOCUMENTS

EP    0 468 713 B1    12/1994
JP    1-478422    7/1989

OTHER PUBLICATIONS foreign translation of JP 01-178422.*

*Primary Examiner* — Jessica Laux
(74) *Attorney, Agent, or Firm* — Oblon, Spivak, McClelland, Maier & Neustadt, L.L.P.

(57) ABSTRACT

The present invention relates to a method of overmolding at least one portion of seal (J) onto a peripheral part of a glazed element (V), said seal comprising at least one insert (1), this insert having an overmolded portion comprising a baseplate (2) and a projecting portion (4) oriented along an axis (A) for prepositioning, positioning or fixing the glazed element (V) in an aperture that it is to close, said method being characterized in that, during injection, the insert is positioned in the molding cavity using at least one pin (11) collaborating with a positioning means (5) situated on said overmolded part so that said baseplate (2) comprises, on a face facing toward the glazed element, at least one bearing tab (6) extending toward the glazed element and coming into contact therewith and, on an opposite face, a mount (3) having a free face supporting said projecting part (4) and which is not covered with the plastic of which the seal is made and in that during release from the mold, the mold is opened and the overmolded glazing removed without the projecting part (4) of the insert (1) coming into contact with the wall of said housing (10).

24 Claims, 3 Drawing Sheets

(56) References Cited

U.S. PATENT DOCUMENTS

| | | | |
|---|---|---|---|
| 5,595,771 A * | 1/1997 | Foltuz et al. | 425/443 |
| 6,128,860 A * | 10/2000 | Repp et al. | 49/398 |
| 6,826,876 B2 * | 12/2004 | Brandner | 52/204.597 |
| 6,942,280 B2 * | 9/2005 | Hintzke et al. | 296/181.2 |
| 8,056,233 B2 * | 11/2011 | Carter et al. | 29/897.2 |

* cited by examiner

METHOD AND DEVICE FOR PRODUCING A WINDOW GLAZING EQUIPPED WITH A PROFILED STRIP COMPRISING AN INSERT, AND WINDOW GLAZING OBTAINED

This application is a 371 of International Application No. PCT/FR08/050862, filed on May 19, 2008, the text of which is incorporated by reference and claims the priority of the French Application No. 0755166, filed on May 21, 2007, the text of which is also incorporated by reference.

The present invention relates to a method of overmolding at least one portion of seal made of a plastic, such as polyurethane, onto a peripheral part of a glazed element, said seal comprising at least one insert, this insert having an overmolded portion positioned inside said seal and a projecting portion projecting out of said seal for prepositioning, positioning or fixing the glazed element in an aperture that it is to close, and, in particular, an aperture in a vehicle bodywork.

The overmolded portion of the insert usually comprises a baseplate, generally of substantially flat shape, and said projecting portion is oriented along an axis.

The method usually involves:

a—a step of positioning said peripheral region at least of the glazed element in a mold comprising at least one moving mold part and at least one other mold part, which may be a fixed part or even a moving part, b—a step of positioning at least one insert in the mold in such a way that the projecting part is positioned in a housing formed in a mold part, c—a step of closing said moving part onto a fixed mold part so as to form a molding cavity, said baseplate being situated in said molding cavity, d—a step of injecting plastic of which the seal is made into said molding cavity, and e—a step of releasing from the mold by moving said moving mold part along a mold-release axis oriented differently to the axis of the projecting part.

The present invention also relates to the device implementing a method of this type, to the glazing thus equipped with its overmolding enclosing at least one such insert, and to such an insert.

The overmolding may surround the entire border of the glazing, that is to say against the edge face of the glazing and against the edge of two opposite main surfaces, in which case the overmolding is generally termed the "encapsulant" and the overmolding operation is generally known as "encapsulation". However, with certain glazings, the plastic is deposited only on one edge of one face of the glazing or just part thereof one all or part of one edge of one face of the glazing and against the edge face thereof. In the remainder of this description, we have therefore retained the term "overmolding", considering it also to include encapsulation.

By way of example of glazings of this type mention may be made of automotive fixed side glazing or automotive fixed corner glazing intended in particular to be applied against the bodywork of the motor vehicle from the outside and to be fixed thereto by screwing from the inside. To this end, those parts of the inserts that project from the overmolding on one face of the glazing generally consist of shanks intended to pass through holes made in the bodywork and which, for the most part, are threaded in order to collaborate with nuts applied from the inside of this bodywork, and, in the case of the remainder, are plain, forming prepositioning or positioning pads.

The inserts currently used are made of plates or baseplates through the central part of which there pass screws the heads of which press and are fixed by any means against one face of the plate and the shanks of which project from the other face, at right angles to the plate.

Figure 1:
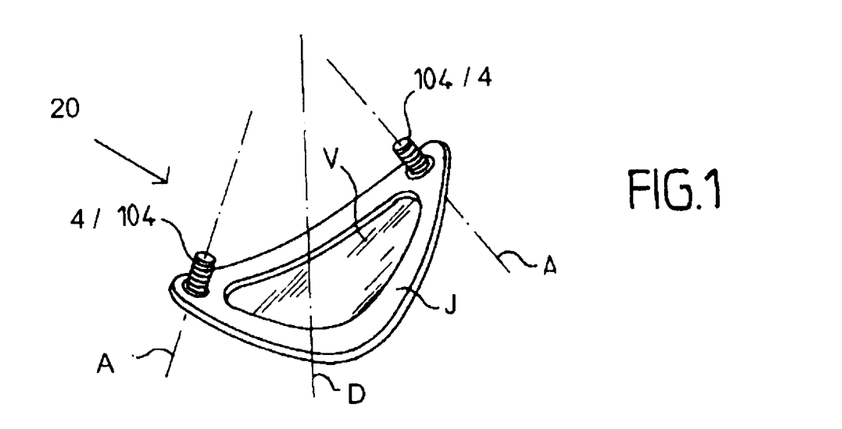
FIG. 1 is a perspective view of corner glazing for a motor vehicle, said glazing being equipped at its periphery with a seal formed by overmolding with projecting fixing inserts.

The attached FIG. 1 shows, in perspective, a bowed glazed element V fitted with its overmolded seal in which there are two inserts located at two opposite corners of the glazing and the projecting threaded shanks 104 of which can be seen. Usually, a greater number of inserts will be needed.

Furthermore, FIG. 1 labels the mold-release axis D and the two axes A of the projecting parts of the two inserts. Because these are situated in two opposite corners of the glazings, the axes of the threaded shanks illustrated are the axes of the projecting parts that are the most steeply inclined with respect to the mold-release axis. Indeed, given the fact that the glazing is curved, the axes of the threaded shanks are inclined with respect to the mold-release axis and this angle of inclination depends on the position of the insert within the overmolding.

European patent application No. EP 468 713 of the prior art discloses a method of overmolding onto a flat glazed element a seal equipped with an insert with a mount that has a rubber ring.

In that document, because the glazed element is flat, the axis of the projecting part is parallel to the mold-release axis.

That method cannot therefore be applied to the overmolding of a seal on a curved glazed element.

Furthermore, that method is not satisfactory because it is difficult over the course of time to keep control over the elasticity of the ring which has both to be supple enough that it is seals while at the same time being rigid enough that the projecting part and therefore the insert can be correctly positioned in the encapsulant.

Also, U.S. Pat. No. 4,723,809 of the prior art discloses a method for overmolding onto a flat glazed element a seal equipped with an insert with a mount.

This mount has a face supporting the projecting part which is not free because it is covered with the plastic of which the seal is made.

Furthermore, the insert has no special positioning means that allow it to be indexed within the frame of reference for the overmolding.

At the present time, most vehicle glazings are at least slightly curved or bowed, or even distinctly curved, and in order to be able to keep the inserts in place while the overmolding plastic is being injected and while the curved glazing is being released from the mold following overmolding, use is made of complex molds with moving blocks because, as indicated hereinabove, the axis of the projecting parts of the inserts then differs from the mold-release axis. Each moving part thus has two extreme positions, a position for holding the insert in place while the plastic is being injected and a retracted position in which it is no longer in contact with the insert, so as to allow the mold to be opened unimpeded by the projecting part of the insert.

Furthermore, the recess, often a conical one, is generally formed in the overmolding around the projecting part in order to seal the insert against the baseplate, or in other words, to prevent the fluid plastic from reaching the projecting part so as not to damage this part.

Figure 2:
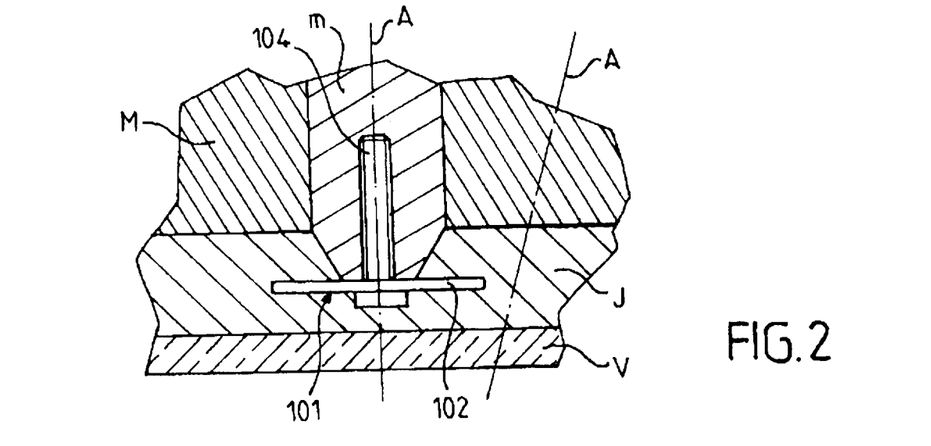
FIG. 2 is an enlarged view in part section, in the region of a fixing insert of glazing of the type illustrated in FIG. 1 and of its overmolding, the glazing of the overmolding still lying inside the mold, the insert being an insert of the prior art, shown in elevation.
Figure 3:
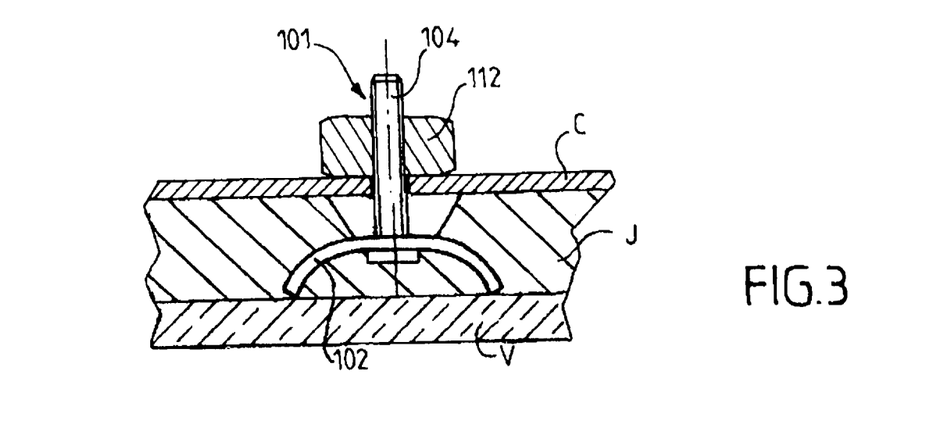
FIG. 3 is a view similar to FIG. 2 showing the glazing in its position mounted in the aperture of a motor vehicle bodywork, in the scenario whereby the screw of the insert collaborating with the bodywork is fully tightened.

FIGS. 2 and 3 thus illustrate the known insert. FIG. 2 shows the upper part of the mould M containing the glazed element V with its overmolding prior to mold release in the region of an insert 101, which is indexed in the mold M and the projecting threaded shank 104 of which is capped by a moving block m which is able to move along the axis A with respect to the mold M. The moving block m ends in a part that tapers toward the end thereof against which the baseplate 102 of the insert 101 presses by its central part. In the molded position, the baseplate 102 of the insert 101, embedded around its entire border in the overmolding of the seal J, therefore lies in a horizontal mid-plane of this seal.

If reference is now made to FIG. 3, it may be seen that this depicts the system illustrated in FIG. 2 in place on a bodywork C, a tightening nut 112 collaborating with the threaded shank 104 of the insert 101 so as to fix the glazing into the aperture that it is to close. This FIG. 3 depicts the threaded shank in the fully tightened condition and shows that, because of this tightening, the baseplate 102 has become bent into a "hump" shape, its two opposite borders along the mid-line of the baseplate then bearing firmly against the glass, at the risk of breaking this glass.

With this known structure it is also fairly frequent for the insert to emerge from the overmolding when the projecting part is being fixed to the aperture if excessive tension is exerted on the projecting part of the insert. Tightening is then performed onto the plastic of the seal.

Furthermore, FIG. 3 also shows that the sealing of the seal overmolded around the threaded part 104 of the insert 101 is afforded only imperfectly, giving rise to the difficulties mentioned above.

To sum up, the current system has numerous disadvantages:
- it is not easy to position inserts correctly during molding because these inserts do not have any fixed points via which they bear against the mold; now, poor positioning of just one of the inserts of a part, be it poor positioning of the axis of the projecting part or incorrect insert insertion height, may lead to the insert concerned being pulled out at the time of mold release or during screwing, thus rendering the entire component defective;
- during screwing, the insert is very highly loaded and may be forced to lean over and bend, applying stress to the glass causing the latter to break;
- the threaded shanks of the inserts are not perfectly sealed in at the time of molding and so plastic—generally fluid polyurethane—reaches the screw threads, this being something that needs to be avoided because if the screw threads are damaged there will be fixing difficulties, thus leading to a defective component;
- the final assembly is not perfectly sealed around the threaded shank of the insert either;
- the mold is complicated by the presence of moving blocks and mold release is therefore not easy.

The applicant has therefore looked for a solution to at least one of the stated problems, namely:
- reducing the high cost of molds with moving block(s) which molds are usually used for overmolding with projecting insert(s) on bowed glazed elements;
- improving the collaboration of the assembly between the glazing and the aperture so that a high tensile force applied to the projecting part of the insert does not unseat it;
- improving the positioning of the projecting part, particularly its inclination with respect to the mold-release axis in the case of bowed glazing;
- improving the molding configuration in order to minimize the finishing operations and, in particular, the need for deburring after overmolding; and
- improving the sealing around the screw part of the insert both during molding and afterwards.

To this end, the present invention proposes a novel insert structure that, in particular, allows:
- correct positioning in the mold by virtue of at least one, and preferably a number of, bearing tab(s) for bearing against the glass and by virtue of indexing means consisting in particular of notches or cutouts which correspond with pads of the mold, it being possible for these notches or cutouts to be as widely spaced as possible;
- elimination of the stresses applied to the glass as a result of the flexibility of the bearing tab(s) and of their special contact surface(s) for contact with the glass;
- a mold without moving blocks;
- correct sealing by clamping not onto the plastic of the overmolding but this time between a shoulder belonging to the insert—which lies flush with the overmolding surface or protrudes beyond it; and the parts of the mold that face it, in order to keep volumes free of plastic so as to allow the spindle part of the insert to be released easily from the mold,
- correct anchoring of the insert within the overmolding.

The present invention thus relates to a method of overmolding at least one portion of seal made of a plastic, onto a peripheral part of a glazed element, said seal comprising at least one insert, this insert having an overmolded portion positioned inside said seal and a projecting portion projecting out of said seal for prepositioning, positioning or fixing the glazed element in an aperture that it is to close, said overmolded portion comprising a baseplate (particularly of substantially flat shape) and said projecting portion being oriented along an axis, said method involving:

a—a step of positioning said peripheral region at least of the glazed element in a mold comprising at least one moving mold part and at least one other mold part (which may be a fixed part or even a moving part), b—a step of positioning at least one insert in the mold in such a way that the projecting part is positioned in a housing formed in a mold part, c—a step of closing said moving part onto a fixed mold part so as to form a molding cavity, said baseplate being situated in said molding cavity, d—a step of injecting plastic of which the seal is made into said molding cavity, and e—a step of releasing from the mold by moving said moving mold part along a mold-release axis oriented differently to the axis of the projecting part, the method according to the invention being notable in that during injection, the insert is positioned in the molding cavity using at least one pin collaborating with a positioning means (or indexing) situated on said overmolded part so that said baseplate comprises, on a face facing toward the glazed element, at least one bearing tab extending toward the glazed element and coming into contact therewith and, on an opposite face (the opposite face to the one that faces toward the glazed element) a mount having a free face supporting said projecting part and which is not covered with the plastic of which the seal is made and in that during release from the mold, the mold is opened and the overmolded glazing removed without the projecting part of the insert coming into contact (directly or indirectly) with the wall of said housing.

Furthermore, as a preference, during injection:
- the axis of the projecting part is oriented substantially at right angles to the mid-plane of the baseplate;
- said bearing tab is compressed against the surface of the glazed element;
- the free face of the mount bears in a sealed manner against the wall of the mold around the housing.

The present invention also relates to a device, particularly for implementing the method according to the invention, for overmolding at least one portion of seal made of a plastic, onto a peripheral part of a glazed element, said seal comprising at least one insert, this insert having an overmolded portion positioned inside said seal and a projecting portion projecting out of said seal for prepositioning, positioning or fixing the glazed element in an aperture that it is to close, said overmolded portion comprising a baseplate and said projecting portion having an axis, said device comprising:

i—a mold for positioning said peripheral region at least of the glazed element, said mold comprising at least one moving mold part which is able to move along a mold-release axis with respect to another mold part, said mold parts collaborating with one another in the closed state in order to form a molding cavity, ii—a mold part comprising at least one housing opening into said molding cavity and accommodating said projecting part of the insert which part is oriented along a different axis to the mold-release axis, said device being notable in that said molding cavity comprises at least one pin collaborating with positioning means which are situated on said overmolded part in such a way that at least one bearing tab positioned on one face of said baseplate facing toward the glazed element extends toward the glazed element and comes into contact therewith when the material is being injected and that, on an opposite face of said baseplate, a mount has a free face supporting said projecting part which is not covered with the plastic of which the seal is made, and in that the housing is large enough that the mold can be opened and the overmolded glazing removed without the projecting part of the insert coming into contact (directly or indirectly) with the wall of said housing.

As a preference, the housing:
  is large enough that the axis of the projecting part can be oriented substantially at right angles to the mid-plane of the baseplate;
  has no moving block;
  is of cylindrical shape oriented along the mold-release axis;
  comprises a magnet or an electromagnet or a suction system for holding said projecting part in place;
  is formed in the moving mold part, but could possibly be formed in a fixed mold part.

Furthermore, the molding cavity preferably has internal pads collaborating with positioning means of the notch(es) and/or opening(s) type which is (are) made in the overmolded part of the insert, and preferably on the baseplate. For holding the insert in place it would furthermore be conceivable for each pin to collaborate with a magnetic part of the insert or alternatively with a part of the insert that is rendered adhesive.

What is important is that the positioning/indexing means provide a fixed frame of reference for positioning/indexing inside the molding cavity in at least two mutually perpendicular directions, and preferably in all three directions of space.

This then provides absolute positioning within the frame of reference for the overmolding.

The present invention relates to a glazing, particularly obtained by implementing the method according to the invention, particularly a motor vehicle glazing, comprising at least one glazed element having a peripheral region equipped with at least one portion of seal made of a plastic, said seal comprising at least one insert (or even a number of inserts, particularly a number of inserts in a single seal portion), this insert having an overmolded portion positioned inside said seal and a projecting portion projecting out of said seal for prepositioning, positioning or fixing the glazing in an aperture that it is to close, said overmolded portion comprising a baseplate and said projecting portion having an axis, said glazing being notable in that the overmolded part of the insert comprises positioning means of the notch(es) and/or opening(s) type and said baseplate comprises, on a face facing toward the glazed element, at least one bearing tab extending toward the glazed element and coming into contact therewith and, on an opposite face, a mount having a free face supporting said projecting part and not being covered with the plastic of which the seal is made.

The axis of said projecting part of the insert is thus oriented along a different axis from the mold-release axis for the overmolded glazing.

The baseplate is preferably positioned substantially parallel to the adjacent surface of the glazed element, and the axis of the projecting part is preferably oriented substantially at right angles to the mid-plane of the baseplate.

The mount preferably has a cross section smaller than that of said baseplate and the mount also preferably has a thickness at least equal to twice the thickness of said baseplate.

The glazing according to the invention preferably comprises a plurality of inserts, and the axes of the projecting parts of at least two inserts are not oriented in the same direction. Furthermore, the axis of the projecting part of each of these two inserts at least is oriented along a different axis from the mold-release axis of the overmolded glazing.

The present invention applies, in particular, to non-planar glazings exhibiting some curvature.

In an alternative form, the baseplate, the mount and the projecting portion are made as a single piece, particularly from a rigid plastic.

In another alternative form, the baseplate, the mount and the projecting portion are made as several assembled pieces made of plastic, metal or metal alloy.

Highly advantageously, the bearing tab is compressed against the surface of the glazed element. That can be seen by taking a section through the seal of the overmolded glazing: the configuration of the insert may have changed by comparison with a rest position in which it was not compressed against the surface of the glazed element.

In an alternative form, said baseplate comprises at least one end bearing tab formed of at least one fold of the material of the baseplate, (at one end thereof) this fold ending in a turn back toward the mid-plane of the baseplate and/or said baseplate comprises at least one flap-like bearing tab formed in the material of the baseplate to create a flap open toward the glazed element and ending in a turn back toward the mid-plane of the baseplate.

Again in an alternative form, said baseplate comprises at least one opening on a main face and/or at least one notch, particularly one with a semicircular bottom, said notch being formed in a transverse edge of the baseplate, along its longitudinal mid-line (for example, two notches formed in two opposite edges of the baseplate, along its longitudinal mid-line).

The baseplate preferably comprises reinforcing means of the rib or bead type along at least two of its longitudinal edges, particularly when the material of which the baseplate and the tab(s) are made is very supple.

The border of the free surface of the mount may comprise sealing means of the O-ring type.

The baseplate is generally preferably of rectangular shape and bears the mount in its central part, said baseplate potentially having openings for improved anchorage in the plastic of which the seal is made.

Finally, the present invention relates to an overmolding insert for a portion of seal of a glazed element having a peripheral region equipped with a portion of seal made of plastic, particularly for implementing the method according to the invention or for the glazing according to the invention.

This insert has a portion intended to be overmolded and to be positioned inside a seal and a projecting portion intended to project out of said seal for prepositioning, positioning or fixing the glazed element in an aperture that it is to close, said overmolded portion comprising a baseplate and said projecting portion having an axis, and it is notable in that the overmolded part of the insert comprises positioning means capable of collaborating with at least one pin situated in an overmolding mold and said baseplate comprises, on a face that is able to face toward the glazed element, at least one bearing tab capable of extending toward the glazed element and capable of coming into contact therewith and comprises, on an opposite face, a mount having a free face supporting said projecting part and which may not be covered with the plastic of which the seal is made.

The special means for positioning this insert are intended to allow the insert to be positioned in absolute terms within the frame of reference for overmolding. They are preferably positioned on the baseplate of the insert.

In order to provide a better illustration of the subject matter of the present invention, a number of particular embodiments thereof will be described hereinafter with reference to the attached drawings.

In these drawings.

Figure 4:
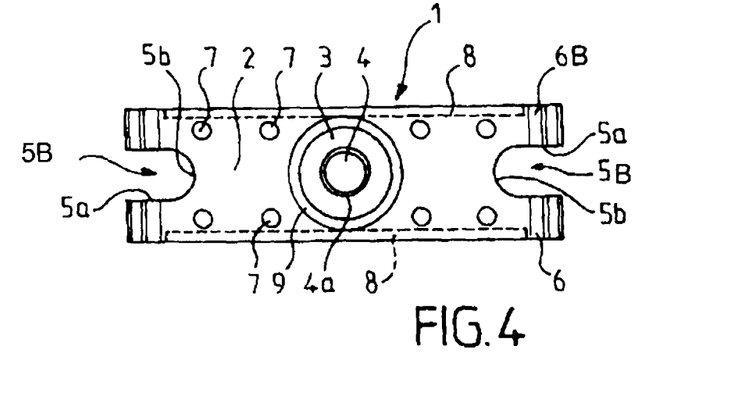
FIGS. 4, 5 and 6 depict a fixing insert produced according to a first embodiment of the present invention, viewed from above, viewed in section along the longitudinal mid-line of the insert, and viewed end-on respectively.
Figure 5:
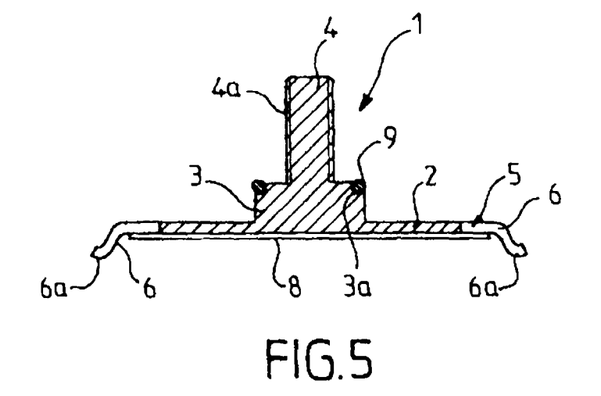
Figure 6:
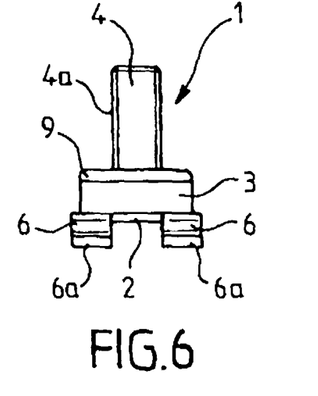

If reference is made first of all to FIGS. 4 to 6, it may be seen that these depict an insert 1 according to a particularly preferred first embodiment of the present invention, the insert depicted here being a fixing insert.

The insert 1 consists of a plate generally of elongate rectangle shape—termed baseplate 2 in the remainder of this description—which plate, on one of its faces and in the middle, bears a disk-shaped protrusion—known as a mount 3 in the remainder of this description—which mount externally and in its middle, along its axis, bears a shank 4a, in this instance a threaded shank, constituting a projecting portion 4 and which is supposed to be used to fix the glazing to the bodywork.

In the example depicted, the baseplate 2, the mount 3 and the shank form a one-piece part, advantageously obtained by molding rigid or relatively rigid plastic such as polycarbonate or polypropylene. The part may, however, just as easily be produced as several parts and formed by assembling these various parts using any means, it being possible for each of these parts to be made of metal or metal alloy or plastic.

Furthermore, the material or materials of which the mount is made are most advantageously materials that do not rust or, if they are not made of such materials, are of materials which have undergone an anti-corrosion surface treatment.

Formed from the two short sides of the baseplate 2 are two notches 5 positioned along the longitudinal central axis thereof. Each notch 5 is delimited by two opposing longitudinal borders 5a connected by a bottom 5b of semicircular shape. Four relatively flexible tabs 6 are thus formed between each border 5a and the longitudinal external border of the baseplate 2, which tabs here, by way of example, are bent at an angle of about 45° with respect to the mid-plane of the baseplate 2 and are bent over at their ends toward the mid-plane of the baseplate 2 in order to constitute external regions 6a which lie in one and the same plane so that they can press flexibly against the glazing as will be described in detail hereinafter.

The baseplate 2 comprises, in its central part—between the two notches 5—along its two longitudinal edges, uniformly distributed openings 7, the purpose of which is explained later.

Furthermore, the two longitudinal edges of the baseplate 2 in this central part are bent over on themselves toward the outside in the direction away from the mount 3 to form strengthening beads or ribs 8. This measure is not always needed, whether or not such beads or ribs are present being dependant upon the material chosen from which to make the baseplate 2.

The mount 3 has, along its upper circular border, a chamfer or relief 3a to house an O-ring seal 9, this again being an optional measure as will be described later on.

In the example depicted, the shank 4a has a screw thread because the insert 1 in this instance is an insert that is fixed by screw fastening. If the insert 1 were to be used solely for indexing the glazing as it is being fitted on the bodywork as indicated above, the shank 4a would have no such screw thread.

Figure 7:
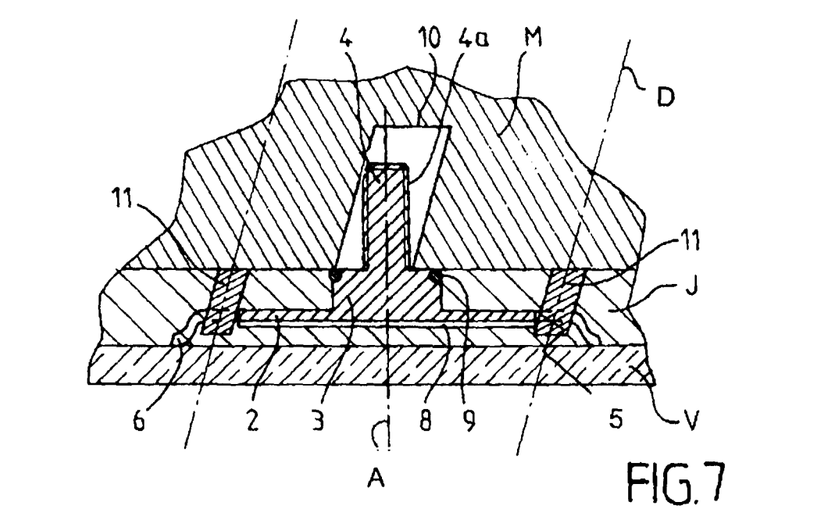
FIGS. 7 and 8 are views similar to FIGS. 2 and 3 respectively, with the insert according to the first embodiment, which insert is shown in section in FIG. 7 and in elevation in FIG. 8.

Reference is now made to FIG. 7 which depicts, in place in a mold part M and prior to mold release, a glazed element V with its overmolded peripheral seal J in which the overmolded part of the insert 1 just described, but not its projecting part, is positioned.

In this figure, the illustrated part of the glazed element is oriented horizontally, but any other configuration is, of course, possible.

With the orientation considered here, only the upper part of the mold M has been depicted in FIG. 7, together with the peripheral part of the glazed element V in the region of an insert 1.

This figure also depicts the axis A of the shank 4a of the projecting part 4 and the mold-release axis D along which the part is released from the mold, that is to say the axis along which the upper moving part of the mold M will be withdrawn after the overmolding curves have been formed using an injection molding machine (not illustrated), these two axes A and D not being parallel.

The wall of the upper part of the mold M which corresponds to the upper surface of the seal as can be seen in FIG. 1, has as many cylindrical housings 10 as there are inserts 1 for the glazed element V provided with its overmolding, and internally (in its surface delimiting the molding cavity), bears, associated with each housing 10, two cylindrical pins 11 fixed to this mold wall by any means, the axes of the housings 10 and of the pins 11 being oriented along the mold-release axis D, and positioned in such a way that, in the molding position, the projecting parts 4 of the inserts 1 fit into the housings 10—as will be described hereinafter—and the two pins 11 of at least semicircular or even circular cross section, each fit into a respective semicircular notch 5B of the baseplate 2 of the insert 1, thus positioning said insert 1 and holding it in position in the mold M both while the mold is being closed and throughout injection.

The surface of the mount 3 is dimensioned such that even in the most critical case of angle of inclination of the axis A of the shank 4a of the projecting part 4 with respect to the mold-release axis D, the part can still be released from the mold.

Molding is performed as follows:
the glazing V is positioned in the lower part of the mold in the known way;
the inserts 1 are positioned against the internal wall of the upper part of the mold, with the shanks 4a fitting into the housings 10 in the mold M, the mounts 3 pressing against the mold M and two pins 11 of the mold immobilizing each insert 1 by fitting into the notches 5B thereof, there possibly being a magnet (not illustrated) in the bottom of the cavity of each housing 10 to hold the insert 1 in place while the mold is being closed;
the mold is closed, the flexible tabs 6 bearing flexibly against the glazed element, to prevent any risk of damage to its surface and to adapt to suit any local curvature and absorb any tolerances in the curvature of the glazed element; the mold is simpler by comparison with molds of the prior art: there are no longer any moving blocks or slides only housings 10 that are large enough to allow the mold M to be opened without this mold coming into contact with the shanks 4a during mold release;
molding is performed by injecting material into the molding cavity; during this injection molding, the fluid plastic is prevented from reaching the shank 4a by the O-ring 9 which provides sealing; however, sealing may just as easily be obtained through direct contact between the mount 3 and the mold M, without the O-ring 9, particularly if the mount 3 is made of plastic.
Once the molding cavity is full and the plastic of the seal has solidified sufficiently, the moving part of the mold is moved using the molding machine along the mold-release axis and the mold is opened; the glazing 20 with its overmolded seal incorporating the overmolded parts of the inserts can then be removed from the mold.

The pins 11 remain permanently in the mold part to which they are fixed: they do not remain on the overmolded glazing; a cavity of a shape that complements each of these pins is thus present in the seal at each of the sites at which a pin was located at the time of injection.

This then achieves overmolding that holds the baseplate of the insert 1 correctly in position, which baseplate is embedded in the plastic, the openings 7, which may have any shape, formed in the baseplate 2 and opening onto both the main faces of the baseplate improve this anchorage of the baseplate because the plastic can pass through the latter.

Glazings equipped with their overmolded seals are mounted in exactly the same way as they were in the prior art, but the fixing is more reliable.

Figure 8:
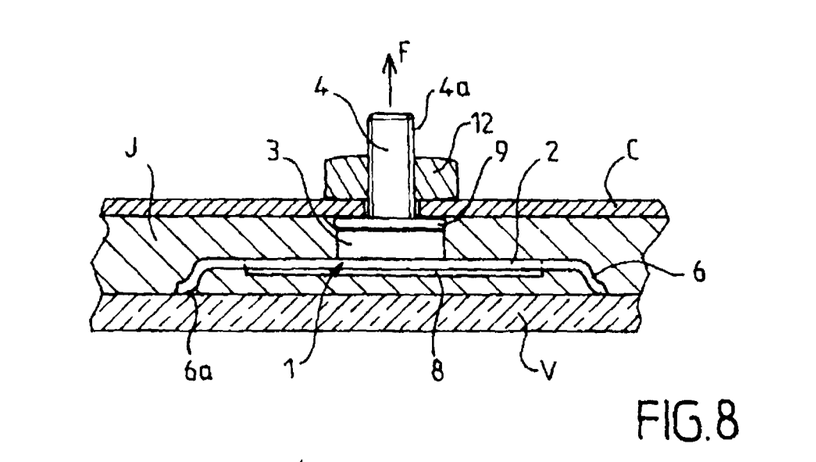

FIG. 8 illustrates an example of mounting by screwing using a nut 12 collaborating with the threaded part of the shank 4a, but the mounting is far more dependable and far more effective than it was in the prior art: there is no longer any seal plastic between the aperture in the bodywork C and the overmolded part of the insert in the region of the fixing, thus avoiding any risk of the insert becoming unseated at this point. If load is applied in the direction of the arrow F, it is the mount 3 that is loaded in compression, rather than the plastic of the seal.

Furthermore, because the mold of the overmolding device no longer has any moving block or slide, it is far simpler to design, to manufacture and to maintain.

Figure 9:
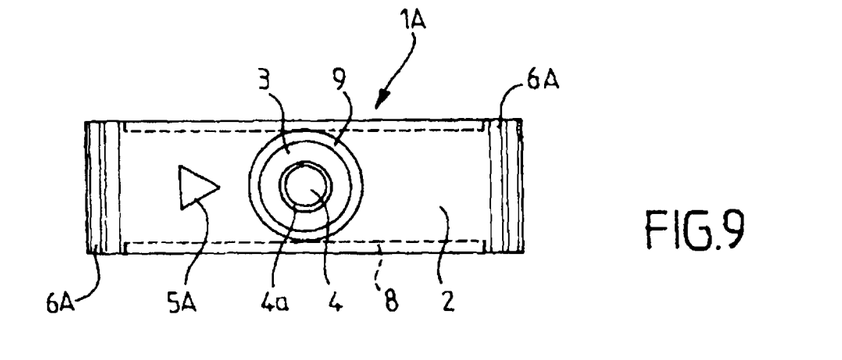
FIG. 9 is a view similar to FIG. 4 of an insert according to a second embodiment of the insert according to the present invention.
Figure 10:
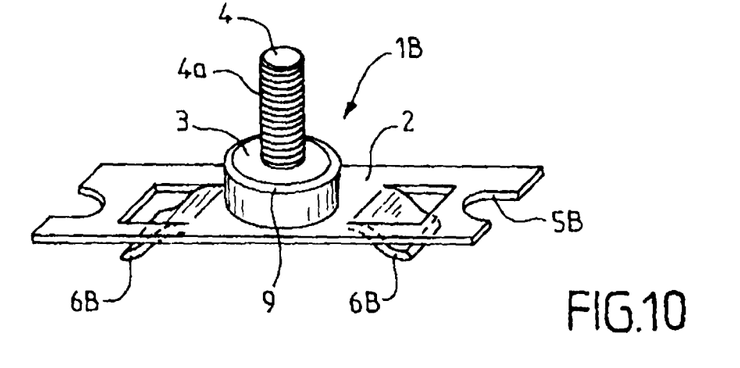
FIG. 10 is a perspective view of an insert according to a third embodiment of the present invention.

FIGS. 9 and 10 depict mounting inserts 1A and 1B respectively according to two other embodiments.

The insert 1A of FIG. 9 no longer has any notches 5B which means that its end bearing tabs 6A extend over the entire length of the baseplate 2. The positioning function that was performed by the notches 5B collaborating with cylindrical pads of corresponding shape belonging to the mold M is performed here by an opening 5A formed in the plate 2 itself, this opening being of triangular shape so that it can collaborate with correspondingly prismatic shaped pads belonging to the mold. Some polygonal shape other than a triangular shape would also suit, provided that the opening and the pad of the pin had complementing shapes collaborating with one another to hold the baseplate 2 in position in the mold during injection.

The insert 1B of FIG. 10 for its part differs from the insert 1 in that flap-like bearing tabs 6B, oriented in the same way as the tabs 6, are formed in the baseplate 2 as a single piece therewith, for example by pressing, in the case of a metal baseplate or directly during the molding of the baseplate 2 when this baseplate is made of plastic, these being formed one on each side of the mount 3 rather than along transverse borders of the baseplate 2. These borders then simply have notches 5B similar to the notches 5B of the first embodiment.

Furthermore, when the mount 3 and/or the adjacent wall of the mold at the time of injection is (or are both) made of plastic, there is no longer necessarily any need to provide a sealing means at the free surface of the mount or at the adjacent surface of the mold, but when these two elements are both made of metal, it is preferable to provide a sealing means of the O-ring type, either at the border of the free surface of the mount 3 or at the surface of the mold, around the hole via which the housing 10 opens onto the surface of the mold.

Of course, the above embodiments have been given by way of nonlimiting indication and modifications can be made without thereby departing from the scope of the present invention as defined by the claims.

The invention claimed is:

1. A method of forming an overmolded seal on a peripheral part of a glazed element, said method comprising:
    positioning the peripheral part of the glazed element in a mold, which includes a moving mold part and an other mold part, together with an insert such that, after the moving mold part is closed onto the other mold part to form a molding cavity:
        a projecting portion of the insert is positioned in a housing formed in the moving mold part that is separated from the molding cavity,
        a tab of the insert is positioned against a surface of the peripheral part of the glazed element in the molding cavity to displace a baseplate of the insert away from the surface of the peripheral part of the glazed element, and
        one or more pins of the mold are aligned with one or more positioning guides of the baseplate;
    injecting plastic into the molding cavity to form the overmolded seal, to embed the baseplate in the plastic of the overmolded seal, and to secure the insert to the peripheral part of the glazed element by the overmolded seal without embedding the projecting portion in the plastic;
    releasing the overmolded seal from the mold by moving the moving mold part along a mold-release axis that is oriented differently to a long axis of the projecting portion.

2. The method as claimed claim 1, wherein, in the injecting, the long axis of the projecting portion is oriented substantially at right angles to a mid-plane of the baseplate.

3. The method as claimed in claim 1, wherein, in the injecting, the tab is compressed against the surface of the peripheral part of the glazed element by contact between the mold and a seal ring of the projecting portion.

4. The method as claimed in claim 1, wherein, in the injecting, a free face of a mount of the insert, which connects the protruding portion to the baseplate, is pressed in a sealed manner against a wall of the mold around the housing.

5. A device to form an overmolded seal on a peripheral part of a glazed element, said device comprising:
a mold to position the peripheral part of the glazed element, the mold comprising a moving mold part to move along a mold-release axis with respect to an other mold part included in the mold, together with an insert such that, after the moving mold part is closed onto the other mold part to form a molding cavity:
a projecting portion of the insert is positioned in a housing formed in the moving mold part that is separated from the molding cavity,
a tab of the insert is positioned against a surface of the peripheral part of the glazed element in the molding cavity to displace a baseplate of the insert away from the surface of the peripheral part of the glazed element, and
one or more pins of the mold are aligned with one or more positioning guides of the baseplate, wherein
after the overmolding seal is formed by injecting plastic into the mold, the overmolded seal is released from the mold by moving the moving mold part along a mold-release axis that is oriented different to a long axis of the projecting portion.

6. The device as claimed in claim 5, wherein the housing has a shape and size to accommodate the projecting portion oriented substantially at a right angle with respect to a mid-plane of the baseplate.

7. The device as claimed in claim 5, wherein the housing has no moving block.

8. The device as claimed in claim 5, wherein the housing is of cylindrical shape oriented along the mold-release axis.

9. The device as claimed in claim 5, wherein the housing comprises a magnet or an electromagnet or a suction system for holding said projecting part in place.

10. The device as claimed in claim 5, wherein the housing is formed in the moving mold part.

11. The device as claimed in claim 5, wherein the housing is formed in the other mold part.

12. The device as claimed in claim 5, wherein the one or more pins are one or more pads that have a polygonal cross-sectional shape that coincide with a shape of one or more holes the one or more guides of the baseplate.

13. A glazing, comprising:
a glazed element having a peripheral part;
an overmolded seal formed on the peripheral part;
a plurality of inserts, each insert including:
a baseplate embedded inside the seal,
a projecting portion projecting out of the seal to position or fix the glazing in an aperture, the projecting portion including a long axis,
a tab positioned against a surface of the peripheral part of the glazed element to displace the baseplate away from the surface of the peripheral part of the glazed element, wherein a portion of a material of the seal is provided between the baseplate and the surface of the peripheral part of the glazed element, and
one or more positioning guides provided in the baseplate for positioning the baseplate relative to the glazed element, wherein
the axes of the respective projecting portions of at least two of the inserts are not oriented in a same direction.

14. The glazing as claimed in claim 13, wherein said baseplate is positioned substantially parallel to the adjacent surface of the glazed element.

15. The glazing as claimed in claim 13, wherein the tab is compressed against the peripheral part of the surface of the glazed element.

16. The glazing as claimed in claim 13, wherein:
the tab is formed of at least one fold of a material of the baseplate, the fold ending in a turn back toward a mid-plane of the baseplate, or
the tab is formed in the material of the baseplate to create a flap open toward the glazed element and ending in a turn back toward the mid-plane of the baseplate.

17. The glazing as claimed in claim 13, wherein said baseplate comprises at least one opening on a main face or at least one notch, said opening or notch being formed in a transverse edge of the baseplate, along its longitudinal mid-line.

18. The glazing as claimed in claim 13, wherein the baseplate comprises reinforcing structure including a rib or a bead along at least two of its longitudinal edges.

19. The glazing as claimed in claim 13, wherein the baseplate is a rectangular shape and bears a mount of the projection portion in its central part.

20. The glazing as claimed in claim 13, wherein the insert includes a mount connecting the baseplate to the projecting portion.

21. The glazing as claimed in claim 20, wherein the mount has a thickness equal to at least twice a thickness of said baseplate.

22. The glazing as claimed in claim 20, wherein the baseplate, the mount and the projecting portion are made as a single piece of a rigid plastic.

23. The glazing as claimed in claim 20, wherein the baseplate, the mount and the projecting portion are made as several assembled pieces made of plastic, metal or metal alloy.

24. The glazing as claimed in claim 20, wherein a border of a free surface of a mount of the projection portion comprises an O-ring seal.

* * * * *